H. KRUGER.
Drop Light.
No. 101,369. Patented March 29, 1870.
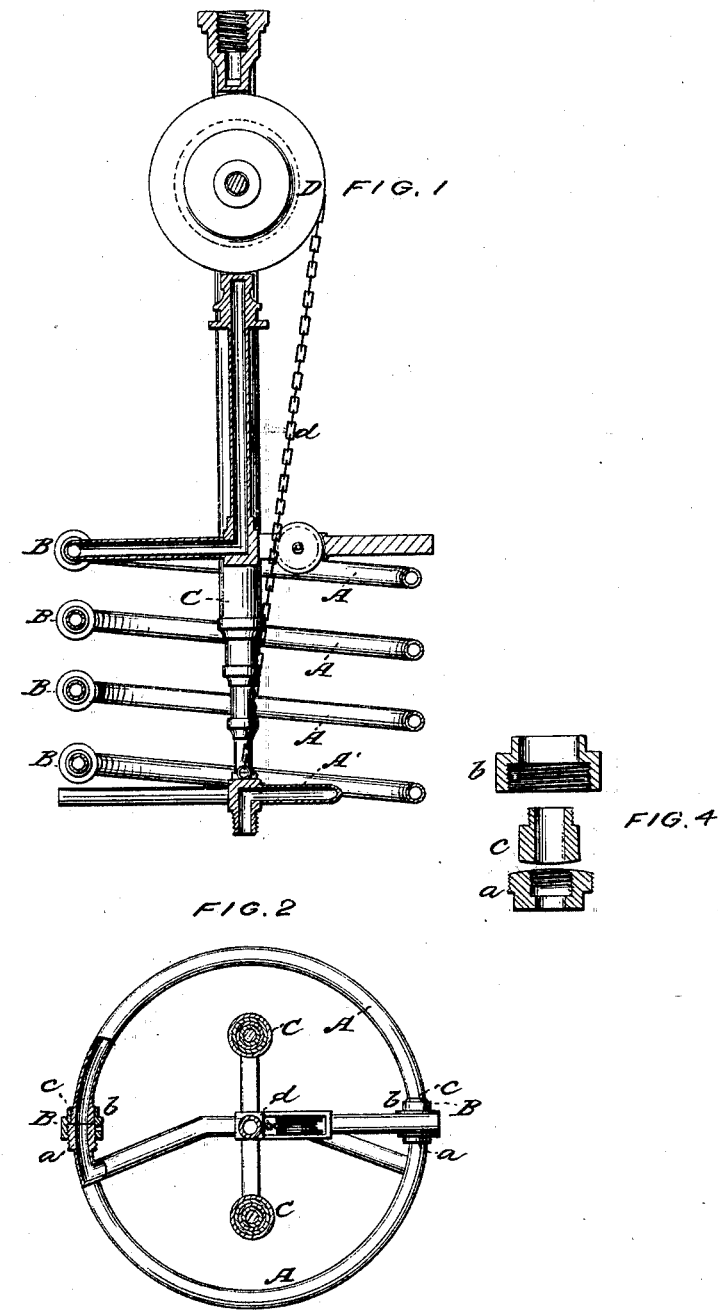

United States Patent Office.

HENRY KRUGER, OF NEW YORK, N. Y.

Letters Patent No. 101,369, dated March 29, 1870.

IMPROVEMENT IN EXTENSION GAS-FIXTURES.

The Schedule referred to in these Letters Patent and making part of the same.

*To all whom it may concern:*

Be it known that I, HENRY KRÜGER, of the city, county, and State of New York, have invented a new and improved Extension Gas-Fixture; and I do hereby declare the following to be a full, clear, and exact description thereof, which will enable those skilled in the art to make and use the same, reference being had to the accompanying drawing forming part of this specification, in which drawing—

Figure 1 represents a vertical section of this invention.

Figure 2 is a horizontal section thereof.

Figure 3 is a sectional view of the swivel-joint.

Similar letters indicate corresponding parts.

This invention relates to an extension gas-fixture, which is composed of a series of curved links, connected at their ends by union swivel-joints, in such a manner that a comparatively small number of joints is sufficient to produce a fixture capable of being extended to a considerable length, and at the same time the passage of the gas through the fixture is nowhere obstructed, the several links and joints remaining wide open whether the fixture is extended or contracted. With the curved links are combined telescopic guide-tubes for the purpose of retaining the fixture in position when the same is partially or wholly extended.

In the drawing—

The letters A A A designate a series of curved links, which are made of gas-pipes and connected together by what may be termed union swivel-joints B.

These joints are constructed each of three parts, *a b c*, the part *a* being fast to one and the part *c* to the adjoining link, while the part *b* forms a screw-cap which screws over the part *a*, and is bored out slightly tapering to receive the correspondingly tapering plug *c*, the joint between the two being rendered tight.

The face of the plug *c* may be rounded off, so that, when the cap *b* is screwed over the nipple *a*, the friction between the adjoining faces of said plug and nipple will be reduced to a minimum.

After the cap has been screwed over the nipple just tight enough to permit the plug *c* to turn in its socket, and the joint between said parts *a b* has been rendered tight by means of red lead or other suitable cement, a union swivel-joint is produced which allows of turning the links in either direction so as to extend or contract the fixture without obstructing the flow of the gas.

The bottom link A' of the series is connected to telescopic tubes C, which serve to steady the fixture in any position into which it may be brought, and which are extended or contracted as the fixture is drawn out or pushed in.

The weight of the extension link is counterbalanced by a spring inclosed in a drum, D, which connects, by a chain, *d*, with the lowest link, so that the fixture will be retained in any position into which it may be brought, and that comparatively little power is required to extend or contract the same.

It must be remarked that instead of several telescopic guide-tubes, only one such tube may be applied, which in that case will be made to extend down through the center of the extension links, and for the balance-spring a weight might be substituted.

By these means an extension gas-fixture is produced, which, with a comparatively small number of joints, can be extended to a considerable length, and the joints of which are so constructed that the passage for the gas remains wide open in whatever position the links may be brought.

What I claim as new, and desire to secure by Letters Patent, is—

1. The series of curved links A A, united by swivel-joints B, and forming a single continuous coil, substantially as set forth.

2. The combination of a telescopic guide-tube, C, (one or more,) with the curved links A A A, substantially as set forth.

3. The rounding off of the surface of the plugs in the union-joint to ease the motion, substantially as described.

This specification signed by me this 1st day of February, 1870.

HENRY KRÜGER.

Witnesses:
W. HAUFF,
E. F. KASTENHUBER.